United States Patent [19]
Cusani et al.

[11] Patent Number: 6,064,703
[45] Date of Patent: May 16, 2000

[54] MAP RECEIVER FOR HIGH-SPEED NUMERICAL TRANSMISSIONS THROUGH RAYLEIGH CHANNELS NOISY AND DISPERSIVE IN TIME AND FREQUENCY

[75] Inventors: Roberto Cusani, Rome; Enzo Baccarelli, Todi, both of Italy

[73] Assignee: Telital S.p.A., Sgonico, Italy

[21] Appl. No.: 08/901,981

[22] Filed: Jul. 29, 1997

[30] Foreign Application Priority Data

Jul. 29, 1996 [IT] Italy ................................. TO96A0659

[51] Int. Cl.$^7$ ....................................................... H04R 1/10
[52] U.S. Cl. ............................................................. 375/349
[58] Field of Search ..................................... 375/349, 346

[56] References Cited

U.S. PATENT DOCUMENTS 5,265,121  11/1993  Stewart .................................... 375/346
5,436,928   7/1995  Fukuawa et al. ....................... 375/232

OTHER PUBLICATIONS

Digital Communications, 3$^{rd}$ Ed., John G. Proakis, pp. 254–257 and 583–601.
Data Communications Principles, Richard D. Gitlin et al, "Automatic and Adaptive Equalization", pp. 517–567.
Introduction to Random Signals and Applied Kalman Filtering, 3$^{rd}$ Ed. Brown et al, pp. 214–248.
IEEE Transactions on Comm, vol. 42, No. 2/3/4, Feb. '94, Kubo et al, "An Adaptive Maximum–Likelihood Sequence . . . ", pp. 1872–1880.
IEEE Transactions on Comm, vol. 43, No. 2/3/5, 1995, Raheli et al, "Per–Survivor Processing: A General Approach . . . ", pp. 354–364.
Avni Morgul et al, "Decision Directed to Channel Parameter . . . ", Signal Processing Eur. Journal, vol. 25, No. 3, Dec. '91, p. 307–318.
Hoeher, P., "TCM on Frequency–Selective Fading Channels . . . ", Commun. Conn. the Future, Dec. 1990, IEEE, vol. 1, pp. 376–381.
Lodge et al, "Maxmium Likelihood Sequence Estimation of CPM . . . ", IEEE Trans. on Com. vol. 38, No. 6, Jun. 1, 1990, pp. 787–794.
Hoeher, P., "Advances in Soft–Output Decoding", Proc. Glob. Comm. Conf., Vo. 2, Nov. 29, 1993 IEEE, pp. 793–797.

Primary Examiner—Stephen Chin
Assistant Examiner—Lenny Jiang
Attorney, Agent, or Firm—Jacobson, Price Holman & Stern, PLLC

[57] ABSTRACT

The present invention relates to a receiver for high-speed numerical transmissions through Rayleigh channels noisy and dispersive in time and frequency in which an accurate estimate of the channel response is combined in an optimal manner with the received data sequence detection procedure. Specifically the a posteriori probability of the Markov chain of the states of the channel with intersymbolic interference are calculated recursively from the data received and from the updated channel estimate. The a posteriori probabilities calculated are used in turn by a Kalman estimator to record the channel variations. On the basis of the sequence of the calculated a posteriori probabilities the detection is then calculated symbol by symbol with the highest a posteriori probability having a small decision delay.

5 Claims, 3 Drawing Sheets

Fig.6

MAP RECEIVER FOR HIGH-SPEED NUMERICAL TRANSMISSIONS THROUGH RAYLEIGH CHANNELS NOISY AND DISPERSIVE IN TIME AND FREQUENCY

BACKGROUND OF THE INVENTION

"MAP receiver for high-speed numerical transmissions through Rayleigh channels noisy and dispersive in time and frequency"

The present invention relates to a receiver of digital signals propagated in a mobile radio communication channel having multiple paths of the varying time type which give rise to distortions in time and frequency with uncertain characteristics having Rayleigh distribution.

As known, a Rayleigh channel is usually defined as a transmission channel in which a signal subject to fast fading with Doppler effect varies in amplitude, frequency and phase in accordance with a statistical law derived from the $\chi^2$ probabilistic distribution.

Given the specialization of the subject, such that it is often necessary for reasons of simplicity to use initials or abbreviated expressions, for any clarifications on the present description reference is made to the numerous publications existing on the subject such as for example:

Digital Communications by J. Proakis,

Data Communications Principle by Gitlin, Hayes and Weinstein, and

Introduction to Random Signals and Applied Kalman Filtering by Brown and Hwang.

The most important causes of worsening introduced in the signal which transits in a high-speed numerical transmission channel consist of the linear distortion or intersymbolic interference (overlapping of symbols belonging to adjacent transmission blocks, abbreviated hereinafter ISI), rapid time variations and severe fading introduced by the multiple paths present.

This occurs especially in high frequency radio links where channel variation is due to the variation in time of the height of the ionosphere strata and in the mobile radio communications where it is introduced by the speed of the vehicle.

In such environments non-linear adaptive equalization is obligatory to avoid serious worsening of the digital link due to the so-called multiple paths phenomenon.

There are two classes of adaptive equalizer most commonly used, i.e. the Decision Feedback Equalizer (DFE) and the receiver with Maximum Likelihood Sequence Estimate (MLSE) based on the Viterbi algorithm (briefly VA, an algorithm which permits calculation in reception of the most likely sequence of the symbols transmitted to reduce the number of calculations optimizing decodification of the convolutional codes).

Strategies based on adaptive DFE have been amply studied in recent years and although they can be considered attractive for many applications due to their simple structure it is known that they are largely sub-optimal compared with solutions based on MLSE in environments having rapid time variations because of the so-called catastrophic events caused by error propagation. However, if the time variations are fast enough the MLSE equalizer is unable to supply a sufficiently accurate estimate of the channel response. To obviate this shortcoming there have recently been proposed new types of MLSE equalizers based on the so-called principle of path survival calculated by the decoder at reception (Path Survival Processing, abbreviated PSP, see for example H. Kubo, K. Murakami, T. Fujino "An adaptive Maximum Likelihood Sequence Estimator for fast varying Intersymbol Interference Channels", IEEE Trans.on Comm., vol 43, n. 2/3/5, pages 1872–1880, 1994; R. Raheli, A. Polydoros, C. K. Tzou "Path Survivor Processing: A General Approach to MLSE in Uncertain Environment", IEEE Trans. on Comm., vol 43, n. 2/3/5, pages. 354–364, 1995).

The performance of these equalizers is undoubtedly good as concerns fast time variations but their implementation is very costly due to the high number of channel estimators necessary.

SUMMARY OF THE INVENTION

The purpose of the present invention is to indicate a receiver which by obviating the above mentioned shortcomings would at the same time permit optimal detection with maximum a posteriori probability (MAP) of the data transmitted and an optimal estimate of the response of the varying time transmission channel all without excessively complicating the receiver structure. To achieve this purpose the present invention has for its subject matter a numerical transmissions receiver having the characteristics described in the first claim.

BRIEF DESCRIPTION OF THE DRAWINGS

Further purposes and advantages of the present invention are clarified in the detailed description thereof given below by way of nonlimiting example with reference to the annexed drawings wherein.

DETAILED DESCRIPTION OF THE INVENTION

To facilitate reading, there are listed below the symbols and terminology used hereinafter.

y(i) sequence of data input to the receiver a(i) transmitted data sequence

L channel pulse response duration measured in multiples of the symbol interval

D data detection delay

S size of the constellation, i.e. of the total of the values which the transmitted symbols could assume ^ symbol indicating the estimated values Ts symbol interval.

Figure 1:
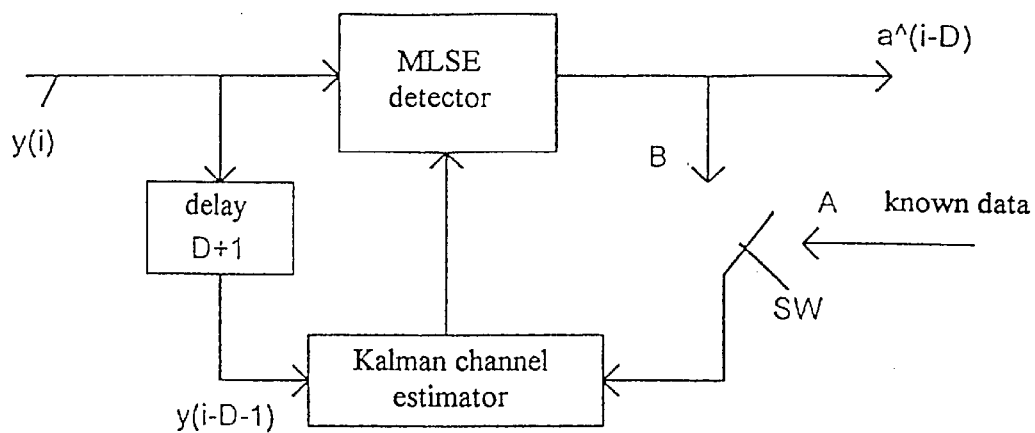
FIG. 1 shows the basic diagram of an adaptive equalizer MLSE.

FIG. 1 shows the traditional architecture of an MLSE equalizer for varying time channels in which a decoder based on the Viterbi algorithm, not shown in the figures, is supported by a Kalman channel estimator (estimator using an algorithm which speeds up convergence of the coefficients of an equalizer for fast signal-variation channels) usually implemented by the standard 'square root' algorithm. The large delay D, which must be on the order of 5L in order to optimize the performance of the MLSE detector, is introduced by the MLSE decisional procedure and does not permit an accurate estimate of the channel response under fast variation conditions. The switch SW periodically switches from position B (data detection mode) to position A (learning mode).

Figure 2:
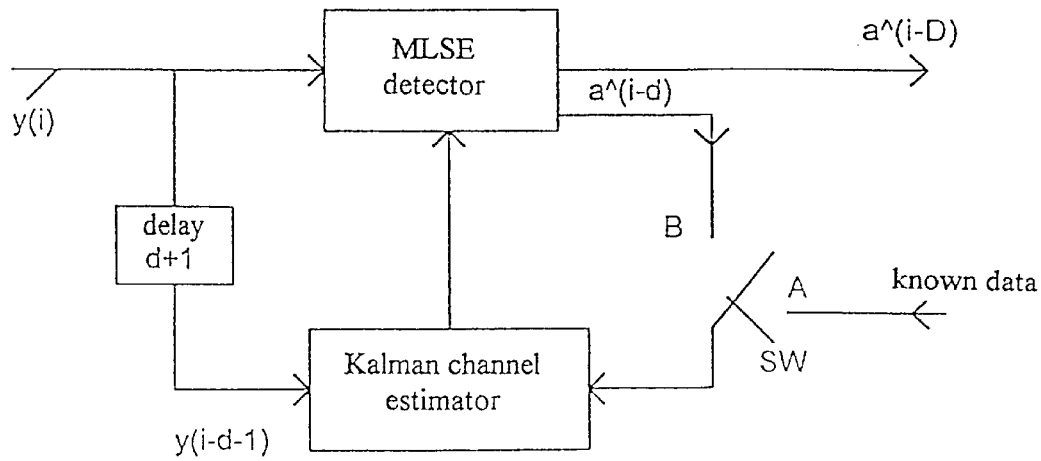
FIG. 2 shows the basic diagram of an improved MLSE equalizer.
Figure 3:
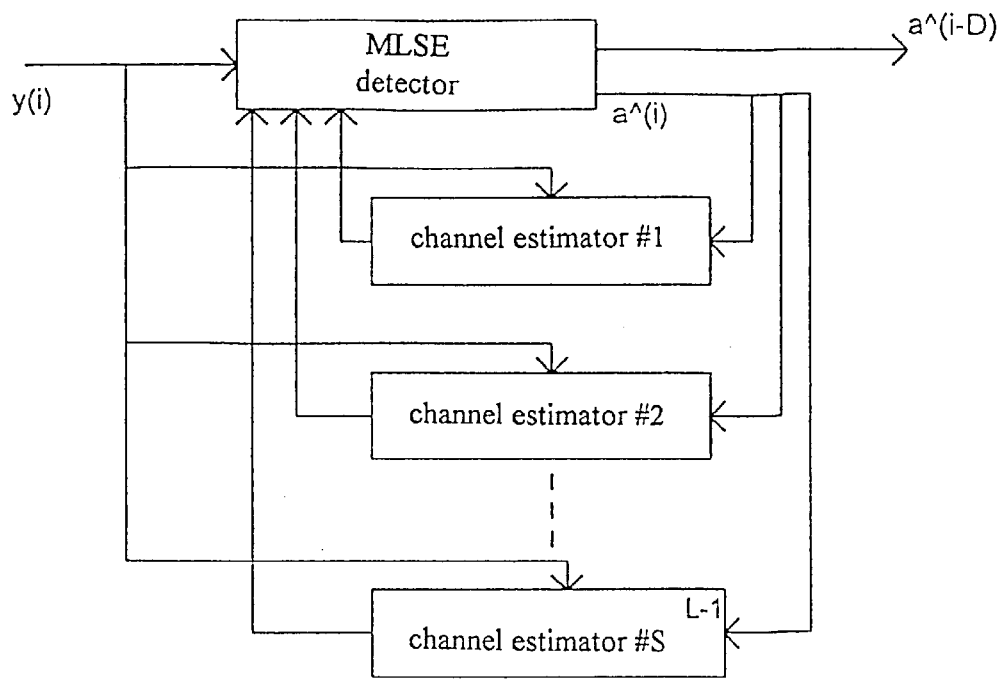
FIG. 3 shows the basic diagram of a quasi-optimal MLSE equalizer based on the path survival processing (PSP) principle.

An improved but not satisfactory version of the traditional diagram is shown in FIG. 2 in which decision 'attempts' with delay d<<D are used by the channel estimator while for the final decision there is the usual delay D. Better results are obtained with equalizers based on the path survival processing (PSP) principle. As shown in FIG. 3 their basic structure consists of an MLSE detector and $S^{(L-1)}$ Kalman channel estimators with the latter being fed by $S^{(L-1)}$ sequences with zero delay as compared with the surviving $S^{(L-1)}$ paths.

But, as mentioned above, this solution is very costly because of the high number of channel estimators.

Figure 4:
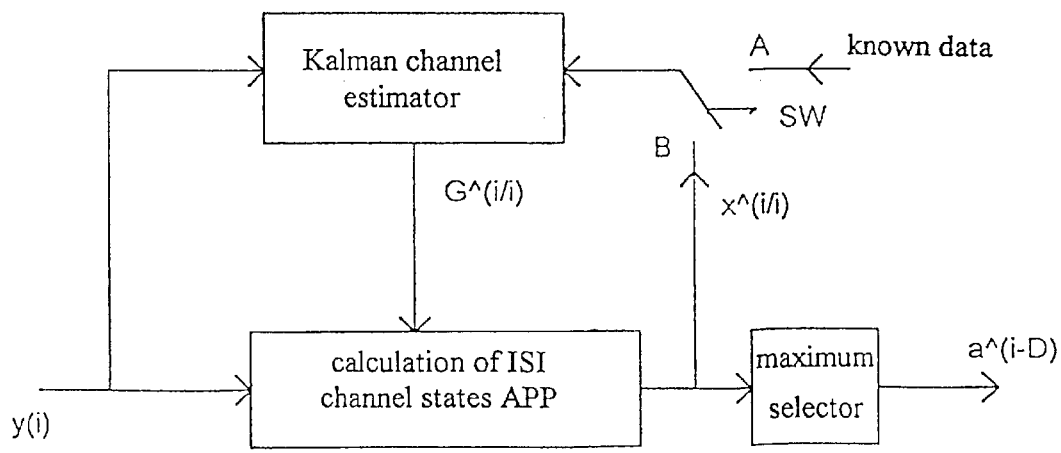
FIG. 4 shows the basic diagram of an equalizer in accordance with the present invention.

Starting from the results already known from the minimum mean square error (MMSE) theory, there is proposed in accordance with the present invention a new type of non-linear adaptive equalizer whose basic structure is shown in FIG. 4.

Basically, the equalizer consists of a MAP decoder and a single Kalman channel estimator. The latter is fed with 'soft' statistics having more informative content supplied by the a posteriori probability (APP) instead of 'hard' statistics having less informative content consisting of the sequences decided and sometimes used in the cases shown in FIGS. 1, 2 and 3. In this the channel estimate is more accurate without however increasing the complexity of the receiver as compared with the standard solutions.

Another important characteristic of the equalizer proposed is that the channel estimating and data detection operations are performed together in a recursive structure which updates step-by-step the current APP estimates and the channel on the basis of the data received.

The present invention will now be described in detail.

Figure 5:
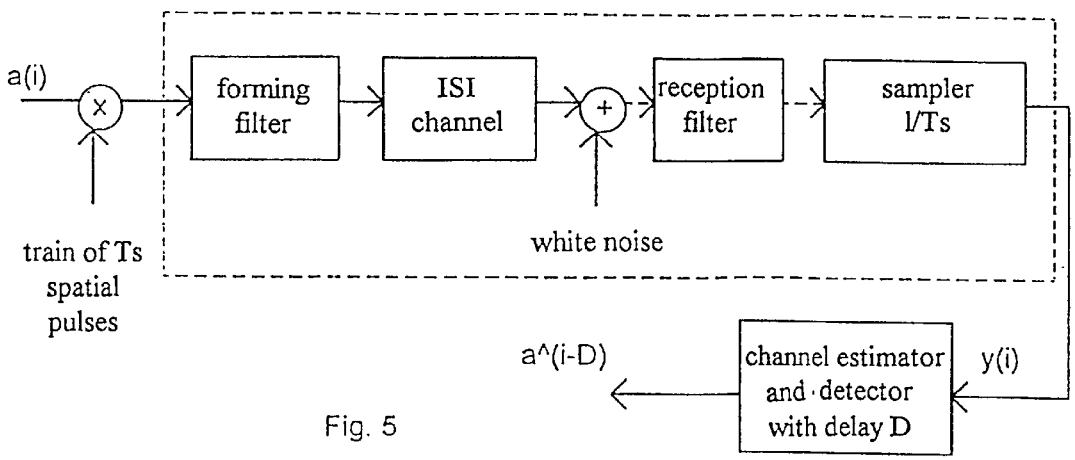
FIG. 5 shows the general diagram of a data transmission and reception system in base-band and discrete time equivalent form.

FIG. 5 shows a block diagram of a data transmission system in base-band and discrete time equivalent form. The part within the dotted lines represents the modulation and distortion introduced by the channel, which includes the intersymbolic interference (ISI) and white noise. In reception the signal is:

$$y(i) = \sum_{m=0}^{L-1} ag(i; m)a(i-m) + v(i) = G^T(i)x(i) + v(i) \quad (1)$$

where g(i;m) represents the channel response and v(i) represents the white noise.

In addition, $G^T(i)$ is the vector $[g(i;0) \ g(i;1) \ldots g(i;L-1)]$ and the uncertain sequence L-dimensional $\{x(i)=[a(i), \ldots a(i-L+1)]\}^T$ constitutes a homogeneous Markov chain of the first order generally known as ISI channel transition state sequence. A Markov chain is a state diagram which describes the possible outputs of a convolutional codifier. A convolutional code is generated passing the information sequence through a linearly running register of finite length. From the statistical viewpoint $\{x(i)\}$ is described by the matrix N×N of the transition probabilities $$F = [F_{rm}] \begin{array}{l} m = 1, N \\ r = 1, N \end{array} \quad \text{and}$$

from the vector $\pi(1)^T = N^{-1}(1_N)^T$ of the a priori probability of the initial state x(1).

Let $D \geq 0$ be the delay, measured in multiples of Ts, permitted to detect the sequence a(i) and $y_1 i = \{y(1) \ldots, y(i)\}$, with $i \geq 1$, the realization of the sequence $\{y(i)\}$ from instant 1 to instant i available in the receiver. Assuming that the structure is the Time Division Multiple Access (TDMA) type the proposed receiver periodically switches from the data detection mode when the switch SW of FIG. 4 is in position B to the learning mode with SW in position A.

Figure 6:
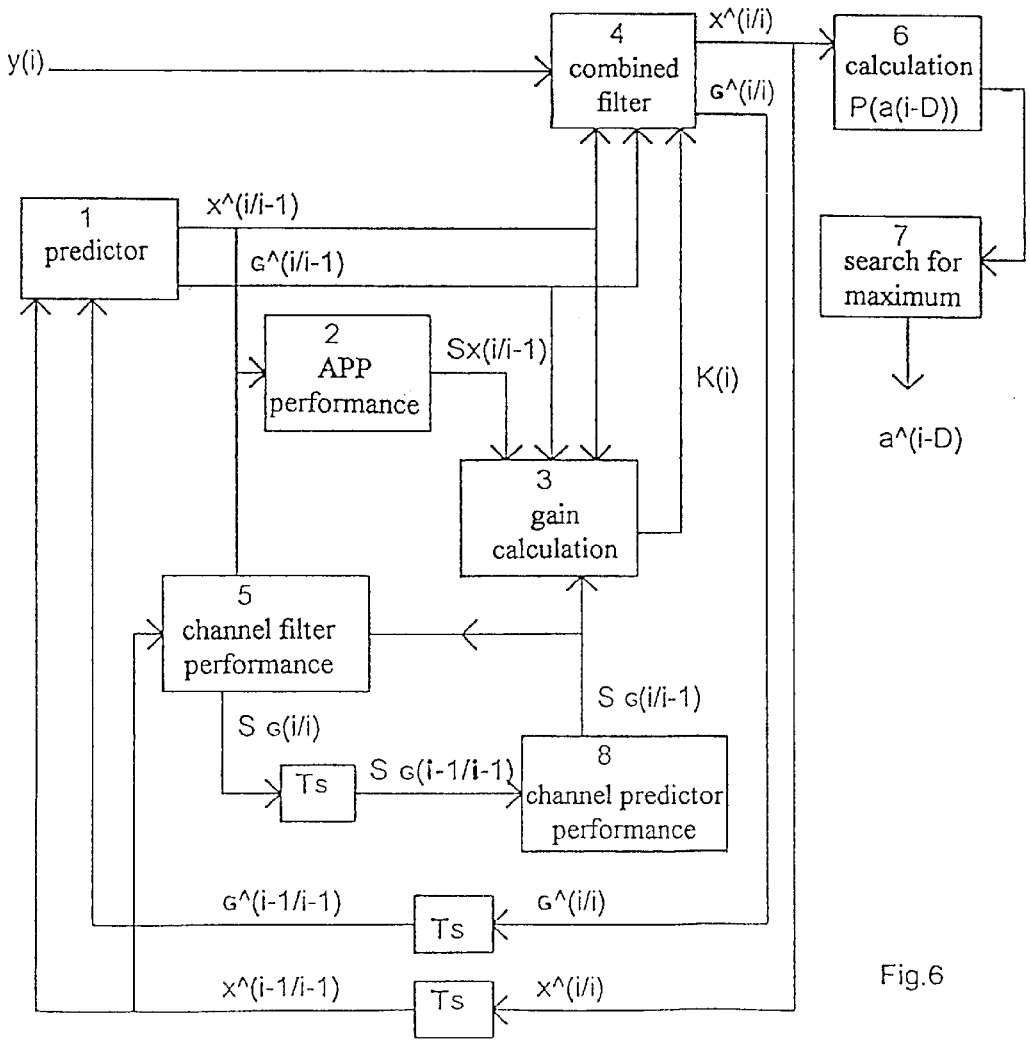
FIG. 6 shows the detailed diagram of an equalizer in accordance with the present invention.

The detection mode is illustrated in detail in FIG. 6. The predictor, shown in block 1, supplies to the combined filter (4) the predictions x^(i/i−1) and G^(i/i−1) updated by the observation of the sequence y(i) received up to the previous step i−1. The prediction error estimate co-variance matrices $S_G(i/i-1)$ and $S_x(i/i-1)$, associated with the predictions G^(i/i−1) and x^(i/i−1) respectively are calculated in blocks 2 and 8 starting from the filtering error co-variance matrix $S_G(j-1/i-1)$, available at instant i−1, and from the prediction x^(i/i−1) calculated at time i.

The gain vector K(i) is used in the combined filter (4) and is calculated in block 3.

Block 4 is the Kalman filter which supplies the estimate of the x^(i/i) data and of the state of the channel G^(i/i). As mentioned above, these estimates are based on the data received up to the immediately preceding instant. Block 5 supplies the filtering error co-variance matrix of G(i), $S_G(i/i)$ calculated from $S_G(i/i-1)$ produced from block 8 and from x^(i/i−1). Block 6 calculates, with a delay D, the a posteriori probability (APP) P(a(i−D)) and block 7 performs the final estimate symbol by symbol seeking the highest from among the a posteriori probabilities (APP) of a(i−D).

In the learning mode, i.e. with the switch SW of FIG. 4 in position A, the receiver estimates the channel with recursive updating obtained by assuming x^(i/i)=x^(i/i−1)=x(i) and $S_x(i/i-1)=0$ since the transmitted sequence is known.

The proposed receiver was compared with the one shown in FIG. 3. The latter has better performance in environments with fast variations in time when the signal-noise ratio (SNR) is very high ($\geq 30$ dB) but comparable performance for SNR values which occur more frequently, i.e. from 15 dB to 30 dB, so that its complexity is not justified in many practical applications in which the proposed receiver is certainly more cost effective.

The use of 'soft' statistics constituted by the APP in place of the 'hard' statistics used in standard receivers permits improvement of channel estimating capacity and supplies good data detection without increasing receiver complexity.

It is clear that numerous variants can be made to the receiver which is the subject matter of the present invention above by way of nonlimiting example without thereby going beyond the protective scope of the following claims. For example the sequence received could be codified in transmission with a Trellis-type channel coding or convolutional coding by means of an appropriate filter inserted upstream or downstream of the forming filter. The receiver remains basically unchanged, allowing for the fact that in this case the combined filter of FIG. 6 no longer estimates only the channel but the cascade thereof and of the coding filter.

If the coding is differential it is sufficient to modify the final operation of association of the bits with the chosen symbol, which is performed on the basis of the difference in phase between the last two symbols received instead of only on the last symbol received. Even if the sequence transmitted is interlaced, the receiver remains unchanged because it operates upstream of the deinterlacer.

What is claimed is:

1. Receiver of digital signals propagated in a mobile radio communication channel having multiple paths of the varying time type which give rise to distortions in time and frequency with uncertain characteristics having Rayleigh distribution and characterized by:

a predictor circuit which, starting from filtered estimates, predicted estimates $\hat{x}(i-1/i-1)$ and $\hat{G}(i-1/i-1)$ calculates estimates $\hat{x}(i/i-1)$ and $\hat{G}(i/i-1)$ of an a posteriori probability $x(i)$ and of a channel $G(i)$ at time i, based on observation of the received sequence $y(i)$ up to time $i-1$;

a first calculation block which, starting from the above mentioned estimate $\hat{x}(i/i-1)$, calculates a co-variance matrix of an error estimate $Sx(i/i-1)$ associated with $\hat{x}(i/i-1)$;

a second calculation block which, starting from a co-variance matrix of a filtering error of $G(i)$ $S_G(i-1/i-1)$, available at time $i-1$, calculates a co-variance matrix of an error estimate $S_G(i/i-1)$ associated with $\hat{G}(i/i-1)$;

a third calculation block which calculates a gain vector $K(i)$ of a Kalman algorithm starting from the above mentioned values calculated previously $\hat{x}(i/i-1)$, $\hat{G}(i/i-1)$, $S_G(i-1)$ and $S_X(i/i-1)$;

a fourth calculation block which calculates a co-variance matrix of a channel filtering error $S_G(i/i)$ starting from the above mentioned values $S_G(i/i-1)$, $\hat{x}(i/i-1)$ and $\hat{x}(i-1/i-1)$;

a fifth calculation block which calculates, starting from $\hat{x}(i/1)$ and with predetermined delay D, the a posteriori probabilities $P(a(i-D))$ of possible symbols transmitted; and a sixth block which performs a final estimate symbol by symbol $\hat{a}(i-D)$ seeking the maximum of the a posteriori probabilities of $a(i-D)$, $a(i-D)$ being the sequence of symbols determined by the receiver of digital signals, which the receiver of digital signals considers the sequence of transmitted symbols.

2. Digital signal receiver in accordance with claim 1 and characterized in that the sequence received is coded with Trellis channel coding.

3. Digital signal receiver in accordance with claim 1 and characterized in that the sequence received is coded with convolutional channel coding.

4. Digital signal receiver in accordance with claim 1 and characterized in that the sequence received is subject to differential coding in transmission.

5. Digital signal receiver in accordance with claim 1 and characterized in that the sequence received is subject to interlacing in transmission.

* * * * *